Jan. 10, 1939.  C. W. SINCLAIR  2,143,456
WHEEL
Filed Feb. 4, 1935
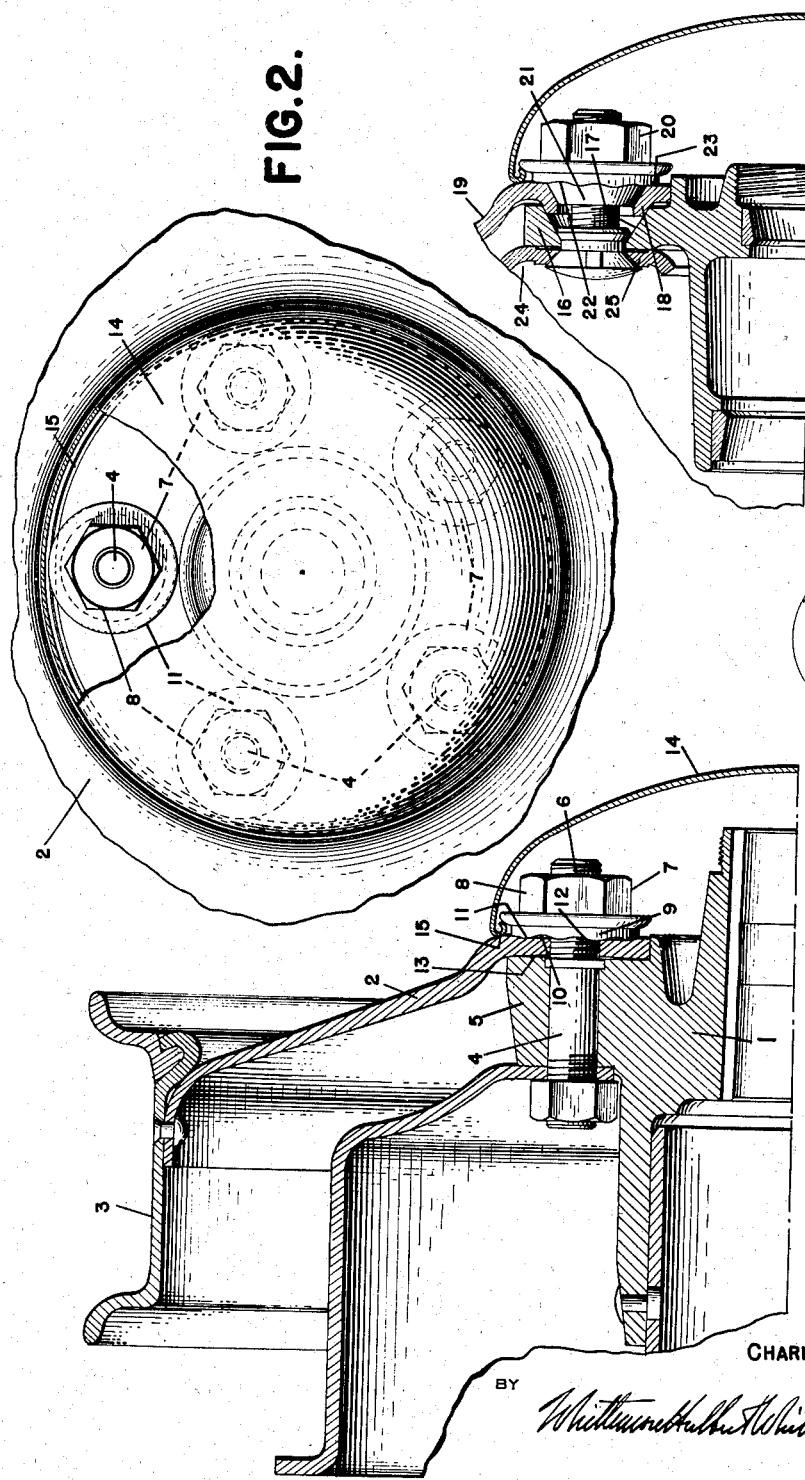
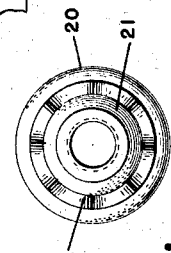
INVENTOR
CHARLES W. SINCLAIR
BY
ATTORNEYS Patented Jan. 10, 1939

2,143,456

UNITED STATES PATENT OFFICE 2,143,456

WHEEL

Charles W. Sinclair, Detroit, Mich., assignor to Kelsey-Hayes Wheel Company, Detroit, Mich., a corporation of Delaware Application February 4, 1935, Serial No. 4,941

3 Claims. (Cl. 301—108)

The invention relates to wheels and refers more particularly to wheels adapted for use with motor vehicles.

One of the objects of the invention is to provide an improved wheel construction having members which are secured together and a cover which conceals the securing means and is secured directly thereto. Another object is to so construct the securing means and cover that the latter is properly centered. Further objects are to provide nuts for detachably securing the wheel members together and to so construct the nuts and the cover that the latter is snapped into engagement with the former; and to provide an improved construction for securing the wheel members together.

With these and other objects in view, the invention resides in the novel features of construction as more fully hereinafter set forth.

In the drawing:

Figure 1 is a radial section through a vehicle wheel showing an embodiment of my invention;

Figure 2 is a front elevation, partly broken away, of a portion thereof;

Figure 3 is a view similar to Figure 1 showing another embodiment of my invention;

Figure 4 is an end view of a nut of Figure 3.

Referring to Figures 1 and 2, the wheel comprises the hub member 1, the wheel body 2 and the tire carrying rim 3. As shown, the hub member 1 is a rear wheel hub, the wheel body 2 is a sheet steel wheel disk and the rim 3 is a solid base rim, but it is apparent that the invention is equally applicable to other constructions. An annular series of bolts 4 extending substantially parallel to the axis of the wheel hub are fixedly secured to the radial flange 5 of this hub and have the threaded portions 6 extending axially forwardly or toward the outboard side of the radial flange for engagement by the nuts 7 to secure the wheel body to the hub.

Each of the securing nuts 7 has the polygonal wrench engaging portion 8, the enlarged annular portion 9 having the relatively flat radially serrated or cam face 10 and the intermediate enlarged annular flange 11. The wheel body 2 is formed with the openings 12 through which the bolts 4 extend and with the radially serrated or cam faced portions 13 at its opposite sides and encircling each of the openings. These portions are preferably of greater diameter than the cam faces 10 and furthermore are disposed so that the required springing of the metal is provided to permit the nuts to be effectively tightened upon their bolts.

14 is a cover at the outboard side of the wheel. This cover extends over and conceals the bolts 4 and the nuts 7 and it is made of resilient material, such as sheet metal. The cover has at its edge the bead 15 which has an internal diameter slightly less than the diametrical distance between the radially outer edges of the annular flanges 11 of the securing nuts. Therefore, to assemble the cover over the nuts the bead must be sprung over the annular flanges 11, after which they snap behind the same and engage their inboard faces. These inboard faces are preferably curved outwardly and forwardly or toward the outboard side to provide for disengaging the cover and to also provide for centering the cover when in place. In this connection, the axial dimension of the bead 15 is such that when the cover is in place the bead, in addition to engaging the inboard sides of the annular flanges 11, engage the outboard side of the wheel body, so that rattling is avoided.

In the modification as shown in Figures 3 and 4, the fixed flange 16 of the wheel hub is provided with the annular series of frusto-conical recesses 17 which are engaged by the frusto-conical driving projections 18 of the wheel body 19. The securing nuts 20 as compared with the securing nuts 7 have in addition the frusto-conical projections 21 for substantially fitting within the driving projections 18. In this connection, the radially serrated or cam face 22 of each nut engages a corresponding outboard face 23 of the wheel body. To provide for tightly screwing down the nuts, the portion of the wheel body surrounding the driving projections may be spaced from the outboard side of the fixed flange 16 and made resilient or the web of the brake drum 24 may be formed with the resilient bosses 25. With this construction, it will be seen that the mounting portion of the wheel body may be strong and substantial; that the wheel body may be effectively secured to the wheel hub; that the securing nuts are effectively locked from accidental disengagement from their bolts; and that the cover for concealing the nuts may be effectively detachably secured in place and centered.

What I claim as my invention is:

1. In a wheel, the combination with a hub member, a wheel body, and means comprising an annular series of nuts for detachably securing said wheel body to said hub member, said nuts each having an annular flange which in the securing position of said nut is spaced from said wheel body, of a cover concealing said nuts and having a resilient bead movable over the flanges of said nuts and resiliently engageable with their inboard faces and the outboard face of said wheel body.

2. In a wheel, a hub member, a wheel body member supported on the hub member, means for securing the wheel body member to said hub member including an annular series of fastener elements having radially outwardly extending shoulders spaced axially outwardly from the outboard side of the wheel body member, and a cover concealing the fastener elements from the outboard side of the wheel body and having a resilient edge movable over the shoulders on the fastener elements and resiliently engageable with the inboard faces of the shoulders and the outboard face of the wheel body.

3. In a wheel, a hub member, a wheel body, means comprising threaded fastener elements detachably securing the wheel body to the hub member, each of the fastener elements having a radially outwardly extending flange spaced axially from the outboard side of the wheel body, and a cover concealing the fastener elements and having a resilient peripheral portion movable over the flanges on the fastener elements into engagement with the inboard sides of the flanges and the adjacent portions of the wheel body.

CHARLES W. SINCLAIR.